(12) United States Patent
Bautista De La Llave et al.

(10) Patent No.: US 8,371,530 B2
(45) Date of Patent: Feb. 12, 2013

(54) AIRCRAFT WITH A REAR FUSELAGE PROTECTION SHIELD

(75) Inventors: Cesar Bautista De La Llave, Madrid (ES); Bernardo Lopez Romano, Madrid (ES); Angel Postigo Rodriguez, Madrid (ES); Jose Sanchez Gomez, Madrid (ES)

(73) Assignee: Airbus Operations, S.L., Madrid (ES)

( * ) Notice: Subject to any disclaimer, the term of this patent is extended or adjusted under 35 U.S.C. 154(b) by 924 days.

(21) Appl. No.: 11/794,487

(22) PCT Filed: Dec. 29, 2005

(86) PCT No.: PCT/EP2005/057212
§ 371 (c)(1),
(2), (4) Date: Oct. 20, 2009

(87) PCT Pub. No.: WO2006/070014
PCT Pub. Date: Jul. 6, 2006

(65) Prior Publication Data
US 2010/0059627 A1    Mar. 11, 2010

(30) Foreign Application Priority Data

Dec. 30, 2004    (ES) .................................. 200403144

(51) Int. Cl.
*B64D 7/00*   (2006.01)
*B64C 1/00*   (2006.01)
*B64C 25/58*  (2006.01)
*F41H 5/04*   (2006.01)

(52) U.S. Cl. ....... 244/121; 244/119; 244/109; 89/36.11; 89/36.02

(58) Field of Classification Search ................ 244/119, 244/120, 121; 89/901, 903, 904, 910, 912, 89/906; 428/641, 634, 684, 446, 408
See application file for complete search history.

(56) References Cited

U.S. PATENT DOCUMENTS

| | | | | |
|---|---|---|---|---|
| 4,411,380 A | * | 10/1983 | McWithey et al. | 228/181 |
| 4,693,435 A | * | 9/1987 | Percival et al. | 244/91 |
| 4,815,678 A | * | 3/1989 | Gawne | 244/109 |
| 5,542,626 A | * | 8/1996 | Beuck et al. | 244/107 |
| 5,579,898 A | * | 12/1996 | Nakagawa et al. | 198/851 |
| 5,747,721 A | | 5/1998 | Speakes et al. | |
| 6,048,805 A | * | 4/2000 | Gottfried | 442/138 |
| 6,523,450 B1 | | 2/2003 | Schreiber | |
| 6,718,861 B1 | * | 4/2004 | Anderson, Jr. et al. | 89/36.02 |
| 2004/0118977 A1 | * | 6/2004 | Anderson et al. | 244/119 |

FOREIGN PATENT DOCUMENTS
DE    198 48 122    12/1999

* cited by examiner

*Primary Examiner* — Tien Dinh
*Assistant Examiner* — Marc Burgess
(74) *Attorney, Agent, or Firm* — Ladas & Parry LLP

(57) ABSTRACT

The invention relates to an aircraft with a protection shield for the rear composite material, fuselage 25) for conducting tail impact tests, in addition to a tail absorber, the shield (11) being formed by a plurality of pieces (21) joined to supports (23) fixed to the rear fuselage (25) behind the tail absorber (1), said pieces (21) having a laminar structure with an outer steel sheet (13), an inner composite sheet (17) and an intermediate high resistance silicon sheet (15).

2 Claims, 3 Drawing Sheets

AIRCRAFT WITH A REAR FUSELAGE PROTECTION SHIELD

FIELD OF THE INVENTION

The invention relates to an aircraft with a protection device for its rear fuselage for conducting tail impact tests.

BACKGROUND OF THE INVENTION

To certify the aircraft and demonstrate it to the Aeronautical Authorities, it is necessary to conduct, among others, tail impact tests, tests such as the VMU (Velocity of Minimum Unstick) and TOP (Take off Performance) tests.

During these tests, the tail of the aircraft comes into contact with the runway in the takeoff phase for the purpose of assuring the maximum incidence angle, and therefore the maximum lift, making it necessary to protect the aircraft structure from the impact against the runway.

In standard aircrafts with a metallic fuselage, such protection is carried out by means of a tail absorber, being unnecessary to protect the part of the aircraft fuselage behind the tail absorber.

In aircrafts with a carbon fiber fuselage, such protection is carried out by means of a tail absorber 10 in a reinforced area of the bottom surfacing of the fuselage 12, as shown in FIG. 6. The absorber absorbs the main loads induced by the impact and prevents direct contact of the fuselage with the ground.

However due to the over-rotation of the aircraft, it is possible for slight contact of the fuselage behind the tail absorber with the takeoff runway to occur, with the drawbacks this entails.

This invention aims to solve this problem.

SUMMARY OF THE INVENTION

To protect the rear fuselage from impact and abrasion, as well as from impacts from rocks, sparks and flames released by the tail absorber, this invention proposes providing the aircraft with an outer shield protecting its surfacing, formed by a plurality of parts joined to supports fixed to the fuselage, said parts having a laminar structure with an outer steel sheet, an inner composite sheet and an intermediate high resistance silicon sheet.

The structure of the rear fuselage of the aircraft is protected and isolated from the temperatures generated by friction, which may reach 600° C., by means of this shield.

Given that the shield is installed during the aircraft flight tests, its design must be compatible with the access doors to the inside of the aircraft, as well as not requiring re-working or modification of the original aircraft structure once the flight testing campaign has concluded. It is also required that its installation and disassembly be as fast and simple as possible.

Other features and advantages of this invention will be understood from the following detailed description of an illustrative embodiment of its object in relation to the attached drawings.

DETAILED DESCRIPTION OF THE INVENTION

Figure 1:
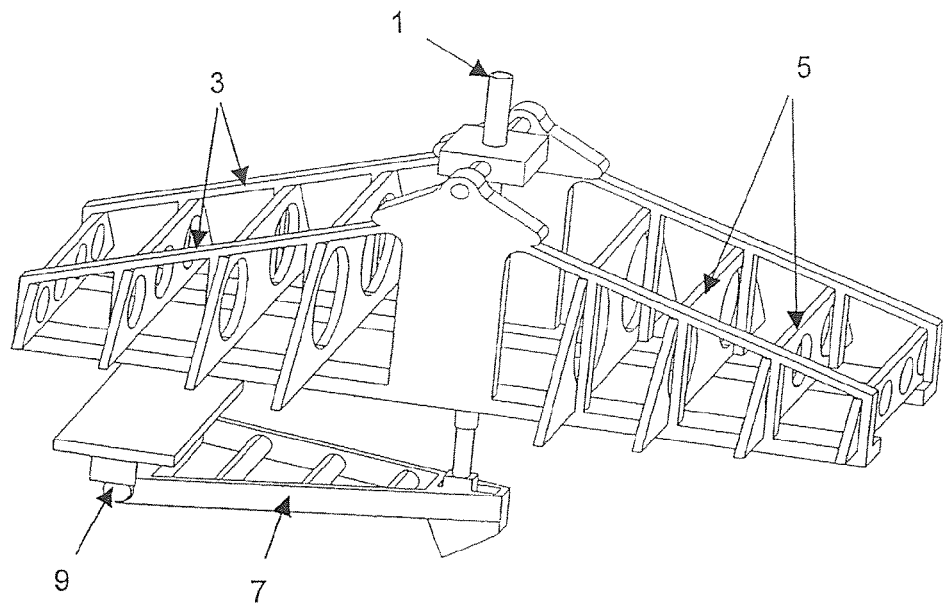
FIG. 1 schematically shows a tail absorber used in aircrafts with a composite fuselage.
Figure 2:
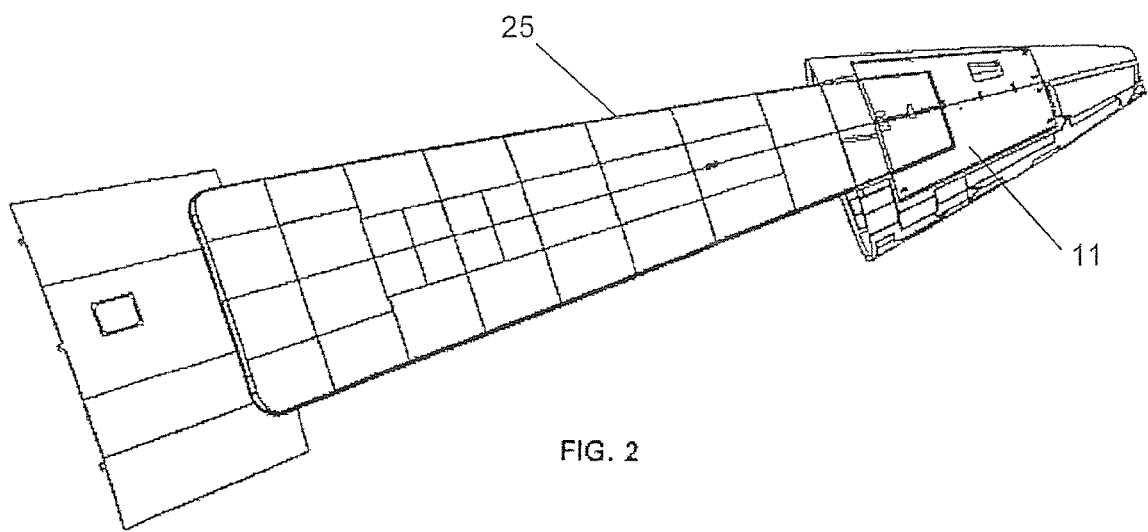
FIG. 2 shows the arrangement of the shield according to the invention on the rear fuselage.
Figure 3:
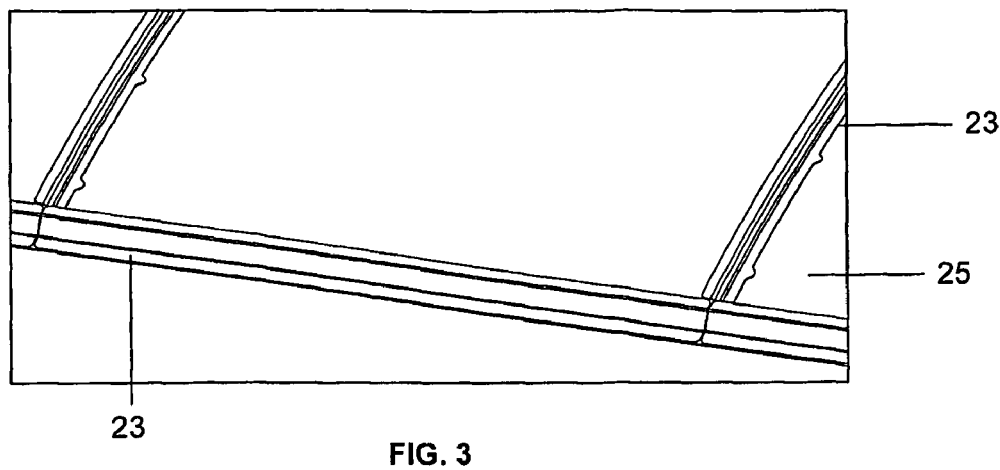
FIG. 3 shows the supports of the shield fixed to the basic aircraft structure.
Figure 4:
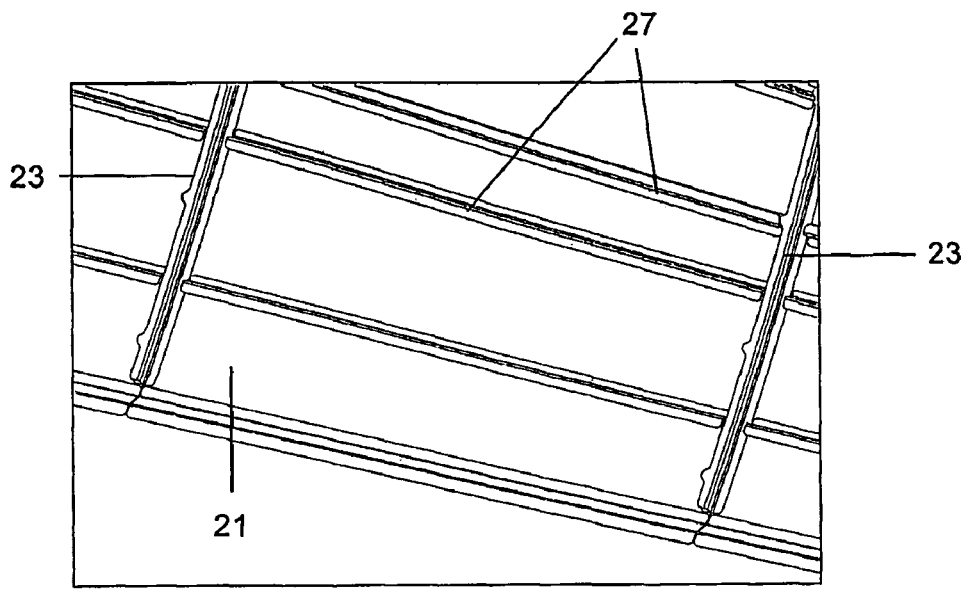
FIG. 4 shows a part of the shield with stabilizing stiffeners which are used as support means on the basic aircraft structure.
Figure 5:
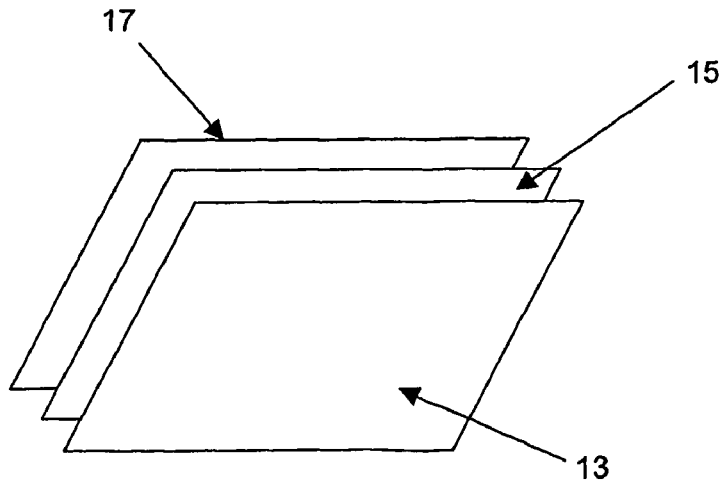
FIG. 5 shows the laminar structure of the shield.
Figure 6:
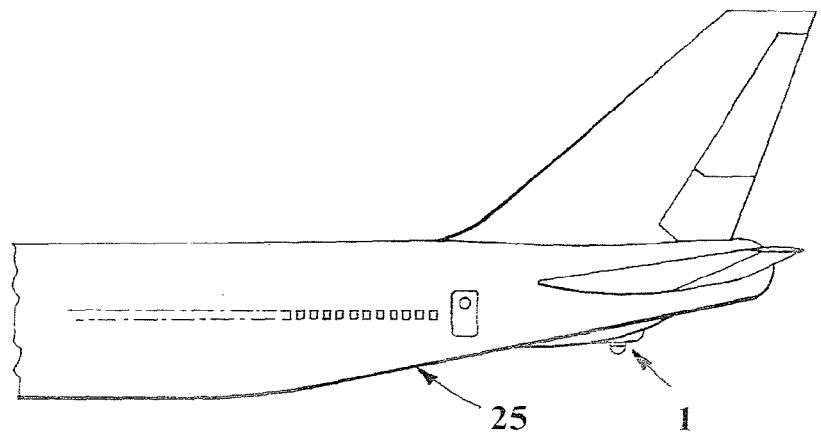
FIG. 6 shows the disposition of the tail absorber in the aircraft of the Prior Art.

To conduct the tail impact tests, aircrafts with a composite fuselage are equipped with a tail absorber 1, such as the one shown in FIG. 1, including a structure formed by reinforcements 3 and stiffeners 5 and a runner 7 with a hinge structure 9 on its rear part.

Figure 7:
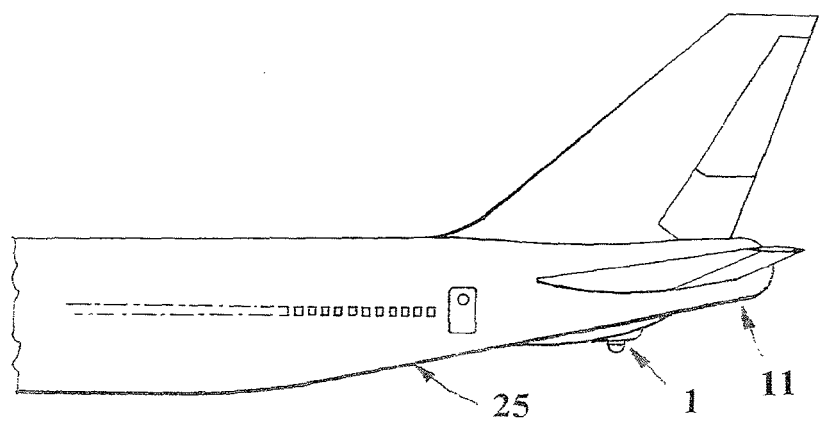
FIG. 7 shows the disposition of the tail absorber 1 relative to the shield in the aircraft of the invention.

According to the invention, the aircraft is also equipped while conducting the tail impact tests with a shield 11 to protect the carbon fiber structure from the impact against the runway and from the impacts of objects, sparks and flames released during contact of the tail absorber against the runway. The shield is fixed the the rear fuselage (25) behind the tail absorber (1) as shown in FIG. 7.

The shield 11 is made with a hybrid laminate including a high resistance, outer stainless steel sheet 13, preferably with a thickness of 0.8 mm, an inner carbon fiber sheet 17 and a resin with high performance under high temperatures (bismaleimide for example), preferably with a thickness of 1.2 mm, and an intermediate silicon sheet, preferably with a thickness of 0.5 mm.

The shield 11 is formed with pieces 21 screwed to supports 23 which are riveted to the rear fuselage 25 of the aircraft.

With this structure, the shield 11 constitutes a means of protection resistant to impacts and abrasion while at the same time being a light means and a thermal insulation means.

In this sense it must be pointed out that the outer steel sheet 13 allows resolving the problem of abrasion and that the laminated construction with the three mentioned components allows optimizing its performance against impacts, allowing the inner composite sheet 17 to minimize its weight.

For its part, the thermal insulation is primarily achieved with the intermediate insulating silicon sheet 15 which, at the same time, functions as an adhesive between the outer steel sheet 13 and the inner carbon fiber sheet 17. Structuring the shield 11 by means of pieces 21 that are easy to assemble and disassemble on supports 23 preferably consisting of bent profiles made of aluminum sheet, allow that the surfacing of the rear fuselage 25 of the aircraft is not damaged in the event of a dent in the shield 11 and improves its thermal insulation. Additionally, the shield may include stabilizing stiffeners 27 serving to facilitate support of the pieces 21 on the fuselage 25.

The shield 11 according to this invention satisfies the following operational purposes:

Protecting the bottom area of the pressure bulkhead (RPB) and of the carbon fiber surfacing.
Protecting the surface of the aircraft from heat and flames up to a temperature of 600° C.
Protecting against sparks.
Protecting against erosion upon contact with the runway.
Protecting so as to not damage the internal aircraft structure (ribs, beams . . . ).
Assuring protection during the entire aircraft testing campaign.
Having a minimum weight.
Not affecting the aerodynamics of the aircraft.

The shield 11 according to this invention corresponds to the following requirements for its installation in the aircraft:

Maximum height of the shield with respect to the aerodynamic surface of the aircraft is less than 40 mm.

Accessibility to the doors of the aircraft located in the area protected with the installed shield.

Ease of assembly and disassembly.

Minimum effect on the original aircraft structure.

Allowing operation of the tail impact indication device.

No interference with the measuring systems during in-flight test, and particularly with the laser telemeter installed on the maintenance door.

Finally, the shield 11 according to this invention satisfies the following design requirements:

It is a structure not subjected to loads except those resulting from the aerodynamic pressures to which it is subjected during its use.

Minimum safety factor: 1.5.

It must allow easy readjustment of the structure so as to return to its original design after the disassembly of the shield once the in-flight tests have concluded.

Any modifications comprised within the scope defined by the following claims can be introduced in the preferred embodiment described above.

The invention claimed is:

1. An aircraft comprising:
   (a) a rear composite fuselage (25) comprising a plurality of supports (23);
   (b) a tail absorber detachably mounted to the rear composite fuselage (25) for conducting tail impact tests on the aircraft, and
   (c) a shield (11) formed by a plurality of pieces (21) having a laminar structure comprising an outer steel sheet (13), an inner composite sheet (17) and an intermediate high heat resistant silicon sheet (15), the shield being detachably joined to the supports of the rear composite fuselage and being disposed behind the tail absorber so as selectively to protect an area of the rear composite fuselage behind the tail absorber from objects, sparks and flames released by the tail absorber upon impact with a runway during takeoff of the aircraft without affecting aerodynamics of the aircraft or accessibility to doors of the aircraft during the tail impact tests.

2. The aircraft according to claim 1, wherein the shield (11) also comprises stabilizing stiffeners (27) to support the pieces (21) on the rear composite fuselage (25).

* * * * *